US010524447B1

(12) United States Patent
Tayebi

(10) Patent No.: US 10,524,447 B1
(45) Date of Patent: Jan. 7, 2020

(54) SPILLAGE-OF-CONTENTS-RESISTANT FOLDABLE TRAY

(71) Applicant: Ronald Mark Tayebi, Chelmsford, MA (US)

(72) Inventor: Ronald Mark Tayebi, Chelmsford, MA (US)

(73) Assignee: Ronald Mark Tayebi, Chelmsford, MA (US)

( * ) Notice: Subject to any disclaimer, the term of this patent is extended or adjusted under 35 U.S.C. 154(b) by 370 days.

(21) Appl. No.: 15/731,566

(22) Filed: Jun. 29, 2017

(51) Int. Cl.
| A01K 1/035 | (2006.01) |
| B65D 5/36 | (2006.01) |
| A01K 1/01 | (2006.01) |
| B65D 5/46 | (2006.01) |
| B65D 5/42 | (2006.01) |

(52) U.S. Cl.
CPC .......... *A01K 1/0125* (2013.01); *B65D 5/3642* (2013.01); *B65D 5/4266* (2013.01); *B65D 5/46128* (2013.01)

(58) Field of Classification Search
CPC .. A01K 1/0125; A01K 1/0245; B65D 5/3642; B65D 5/4266; B65D 5/46128; B65D 5/248; B65D 5/2047; B65D 5/46144; B65D 5/3678
USPC ... 229/108.1, 186, 117.06, 117.14, 103, 112, 229/114, 117, 117.05; 119/168, 498; 206/747; 493/104, 311
See application file for complete search history.

(56) References Cited

U.S. PATENT DOCUMENTS

| 1,700,758 | A | * | 2/1929 | Berkowitz | ........... | B65D 5/3635 |
| | | | | | | 229/117.05 |
| 3,913,823 | A | * | 10/1975 | Lin | ........ | B65D 5/248 |
| | | | | | | 229/126 |
| 3,964,668 | A | * | 6/1976 | Lin | ........ | B65D 5/2047 |
| | | | | | | 229/114 |
| 4,792,082 | A | * | 12/1988 | Williamson | ......... | A01K 1/0125 |
| | | | | | | 119/168 |
| 5,062,527 | A | * | 11/1991 | Westerman | .......... | B65D 5/3678 |
| | | | | | | 229/117 |
| 5,094,188 | A | * | 3/1992 | Wolak | .................. | A01K 1/0125 |
| | | | | | | 119/168 |
| 5,572,951 | A | * | 11/1996 | Evans | .................. | A01K 1/0125 |
| | | | | | | 119/168 |
| 5,839,392 | A | * | 11/1998 | Pemberton | ........... | A01K 1/0245 |
| | | | | | | 119/498 |
| 6,253,993 | B1 | * | 7/2001 | Lloyd | .................. | B65D 5/2047 |
| | | | | | | 229/112 |
| 7,665,654 | B2 | * | 2/2010 | McLeod | .............. | B65D 5/4608 |
| | | | | | | 229/143 |
| 7,870,995 | B1 | * | 1/2011 | Kaltman | .............. | B65D 5/2047 |
| | | | | | | 229/175 |
| 8,343,024 | B1 | * | 1/2013 | Costanzo, Jr. | ......... | B65D 5/241 |
| | | | | | | 493/128 |
| 9,656,779 | B2 | * | 5/2017 | Arki | ...................... | B65D 5/3642 |
| 9,676,511 | B2 | * | 6/2017 | Kaltman | ............. | B65D 5/2047 |

(Continued)

*Primary Examiner* — Christopher R Demeree
(74) *Attorney, Agent, or Firm* — Amad Tayebi; American Patent Associates

(57) ABSTRACT

A nestable foldable disposable tray is disclosed which features a cavity comprising a base and an outwardly slanted continuous wall. A set of fold lines in the base and the surrounding wall causes the tray to collapse inwardly when closed and gives the contents of the tray a lateral displacement which makes the tray resistant to spillage of its contents while it is being folded.

1 Claim, 8 Drawing Sheets

(56) References Cited

U.S. PATENT DOCUMENTS

| | | | |
|---|---|---|---|
| 2002/0011514 A1* | 1/2002 | Cai .................... | B65D 5/2047 |
| | | | 229/120.18 |
| 2003/0164397 A1* | 9/2003 | Robinson ............ | B65D 5/2047 |
| | | | 229/114 |
| 2004/0031842 A1* | 2/2004 | Westerman .......... | B65D 5/2057 |
| | | | 229/117.06 |
| 2010/0089989 A1* | 4/2010 | Kwok .................. | B65D 5/248 |
| | | | 229/186 |
| 2016/0106248 A1* | 4/2016 | Petersen .............. | B65D 81/36 |
| | | | 206/747 |

\* cited by examiner

SPILLAGE-OF-CONTENTS-RESISTANT FOLDABLE TRAY

FIELD OF THE INVENTION

The present invention is in the field of disposable foldable trays.

BACKGROUND OF THE INVENTION

Presently, disposable trays, including cat litter trays, fall into two main types. Trays of the first type have outwardly slanted walls, i.e., their side walls are oriented at an angle of less than 90 degrees (typically from 60 to 80 degrees) relative to the plane on which the tray is placed. These trays make it possible to stack them in a nested configuration and thus minimize the occupied shelf space/volume per tray. This feature (known as nested stackability) is desirable to the retailer of disposable trays as well as to the consumer who buys more than one tray at a time. A prior art example of this type of trays is disclosed in U.S. Pat. No. 4,716,853 (Jan. 5, 1988), issued to d'Aniello, and is herein incorporated, by reference, in its entirety. Typically, these trays are made of plastic material and often are thermoformed from plastic material sheets. Also, in some configurations, as disclosed in U.S. Pat. No. 4,716,853, they are designed to include a bottom cavity (or a recessed bottom) filled with liquid-absorbent litter granules and covered with a removable paper sheet or plastic film liner. An advantage of trays of this type is that, as purchased, they are ready to use and no assembly is required. However, trays of this type are also very difficult to fold and thus are not folded, as sold as well as after being used. They are also difficult to fit in a trash collection barrel. Furthermore, when the consumer attempts to fold them in order to dispose of them, the litter granules accumulate and heap in the lateral middle line zone of the tray and spill out of the tray, over the long side walls of the tray. For the purpose of this disclosure, the lateral middle line zone of a rectangular tray is defined as the area immediately adjacent to and surrounding the lateral axis of symmetry of the tray; wherein the lateral axis of symmetry of the tray is perpendicular to the long side of the rectangular tray.

Trays of the second type have vertical side walls, i.e., their side walls are oriented at an angle of 90 degrees relative to the plane on which the tray is placed. They are usually made of cardboard sheets suitably die cut and scored to form vertical side walls folded or foldable trays and boxes. As compared to trays of the first type, a disadvantage of trays of this type is that, in their ready to use configuration, they occupy a much larger shelf space per unit. An improved tray of this type is disclosed in U.S. Pat. No. 7,255,261 (Aug. 14, 2007), issued to Mesly, and is herein incorporated, by reference, in its entirety. As disclosed therein, Mesly teaches a vertical wall type tray having three configurations, a flat folded (as offered for sale) configuration, an assembled (presumably by the consumer) vertical walls configuration and a folded (ready for disposal) configuration.

Other prior art patents disclose cat litter trays and boxes; for example U.S. Pat. Nos. 5,035,205, 6,382,131, 6,676,010, and 5,205,476, each of which is herein incorporated, by reference, in its entirety.

All currently available, as well as disclosed in the prior art, disposable cat litter trays suffer from the problem of litter granules accumulating and heaping in their lateral middle line zone and across the entire width of the tray when the consumer attempts to fold them in order to dispose of them. Often, litter granules spill out of the tray, over the long side walls of the tray.

OBJECTIVE OF THE PRESENT INVENTION

The objective of the present invention is to provide a ready to use, as purchased, outwardly slanted-wall type foldable, and easy to dispose of, cat litter tray. The cat litter tray of the present invention is also nestable and may be stacked in order to minimize the shelf space volume occupied per unit. The cat litter tray disclosed herein also prevents/does not allow spillage of the litter granules, over the side walls of the tray, when the tray is folded by the consumer prior to disposal. Also, as folded, the cat litter tray of the present invention is compact and easy to fit into a trash collection barrel.

In this disclosure, a complete and enabling description of the structure of the tray of the present invention and a method of its manufacturing are provided.

Description of Structural Components and Geometric Elements as Shown in the Drawings and as Defined in Definition of Terms In order facilitate visualizing and understanding the present invention and the claims and with reference to FIGS. 1 to 8, a variety of numbers, letters and symbols are used, in the description of the invention, in the drawings and in the claims, for referring to the following components of the tray of the present invention:

1: spillage-of-contents-resistant foldable tray.
2: base of tray 1, comprising rectangular right portion 3, rectangular left portion 4 and rectangular middle portion 5.
3: a generally rectangular right portion, having an upper surface.
4: a generally rectangular left portion, having an upper surface.
5: a generally rectangular middle portion, having an upper surface and being located between said right portion 3 and said left portion 4 of said base 2.
6: right common fold/folding line joining said right portion 3 and said middle portion 5.
7: left common fold/folding line joining said middle portion 5 and said left portion 4.
8: outwardly slanted right short side of wall 12.
9: outwardly slanted rear long side of wall 12, comprising segments 24, 25, 26, 27 and 28.
9A: higher height rear long side.
10: outwardly slanted left short side of wall 12.
11: outwardly slanted front long side of wall 12, comprising segments 30, 31, 32, 33 and 34.
11A: higher height front long side.
12: continuous outwardly slanted wall, surrounding base 2, comprising right short side 8, rear long side 9, left short side 10 and front long side 11 and, in combination with base 2, defining and forming cavity 13.
13: cavity of tray 1.
14: right base short line, joining right short side 8 to right portion 3.
15: rear base long line, joining rear long side 9 to right portion 3, middle portion 5 and left portion 4.
16: left base short line, joining left short side 10 to left portion 4.
17: front base long line, joining front long side 11 to left portion 4, middle portion 5 and right portion 3.

18: right handle, joined to right short side 8 at top edge 45 of right short side 8.
19: left handle, joined to left short side 10 at top edge 46 of left short side 10.
20: right front corner line, joining right short side 8 and front long side 11.
21: right rear corner line, joining right short side 8 and rear long side 9.
22: left rear corner line, joining left short side 10 and rear long side 9.
23: left front corner line, joining left short side 10 and front long side 11.
24: right rigidly-held segment of rear long side 9.
25: immediate right adjacent segment of rear long side 9.
26: middle segment of rear long side 9.
27: immediate left adjacent segment of rear long side 9.
28: left rigidly-held segment of rear long side 9.
30: left rigidly-held segment of front long side 11.
31: immediate left adjacent segment of front long side 11.
32: middle segment of front long side 11.
33: immediate right adjacent segment of front long side 11.
34: right rigidly-held segment of front long side 11.
35: fold line, preferably positive fold line, joining segments 24 and 25.
36: fold line, preferably negative fold line, joining segments 25 and 26.
37: fold line, preferably negative fold line, joining segments 26 and 27.
38: fold line, preferably positive fold line, joining segments 27 and 28.
39: fold line, preferably positive fold line, joining segments 34 and 33.
40: fold line, preferably negative fold line, joining segments 33 and 32.
41: fold line, preferably negative fold line, joining segments 32 and 31.
42: fold line, preferably positive fold line, joining segments 31 and 30.
43: longitudinal axis of symmetry of tray 1.
44: lateral axis of symmetry of tray 1.
45: top edge of right short side 8.
46: top edge of left short side 10.
50: central zone of base 2.
51: litter granules or other contents of foldable tray 1.
52: Die cut and scored, with fold lines, blank sheet used for making foldable tray 1, as shown, for example, in FIG. 8. Preferably, blank sheet 52 having at least its upper surface coated with a low melting point impermeable plastic/adhesive film.
53: Right front assembly flap.
54: Right rear assembly flap.
55: Left rear assembly flap.
56: Left front assembly flap.
S: Arrows showing directions of pushing segments 26 and 32 towards the interior of cavity 13.
Z: Arrows showing directions of lifting handles 18 and 19 in order to close/fold foldable tray 1.
Q: Arrows showing directions of automatic rotation of segments 25, 27, 31 and 33 towards the interior of cavity 13 upon lifting handles 18 and 19 in order to close/fold foldable tray 1.
L: Displacement component, of cat litter granule or other content 51, parallel to lateral axis of symmetry 44 of tray 1.
A: Displacement component, of cat litter granule or other content 51, parallel to longitudinal axis of symmetry 43 of tray 1.
R: Resultant displacement, of cat litter granule or other content 51, towards central zone 50 of base 2.
g: Direction of gravitational force/acceleration.

Definition of Terms

A Fold/Folding or a Crease Line: is a line offering a lower resistance to bending/folding, when a bending/folding action (moment or torque) is applied to a sheet material containing said fold/crease line and causing a bending moment around an axis substantially parallel to said fold/crease line, than the zone of said sheet material surrounding said fold/crease line, thus causing such a bending/folding action to result in a localized bend or fold coinciding with the fold/crease line. In accordance with the present invention, a fold/crease line may be obtained by a scoring action, partial cut(s), perforations, slits, micro-perforations, and other sheet material weakening actions or techniques known in the art, made along the fold/crease line.

Positive Fold/Folding or Crease-Directing Line: is a fold/crease line that offers lower resistance to folding/creasing along its length when bent/folded to bring the upper or interior surfaces of its surrounding segments towards one another than when bent/folded to bring the lower or exterior surfaces of its surrounding segments towards one another. In the Drawings, a positive fold line is indicated by the letter P.

Negative Fold/Folding or Crease-Directing Line: is a fold/crease line that offers lower resistance to folding/creasing along its length when bent/folded to bring the lower or exterior surfaces of its surrounding segments towards one another than when bent/folded to bring the upper or interior surfaces of its surrounding segments towards one another. In the Drawings, a negative fold line is indicated by the letter N.

Nestable Tray: is an open top tray having a base surrounded with an outwardly slanted wall wherein each dimension of said base is smaller than its open top corresponding dimension. FIG. 1 shows a Nestable tray in accordance with the present invention.

DESCRIPTION OF THE INVENTION

Figure 1:
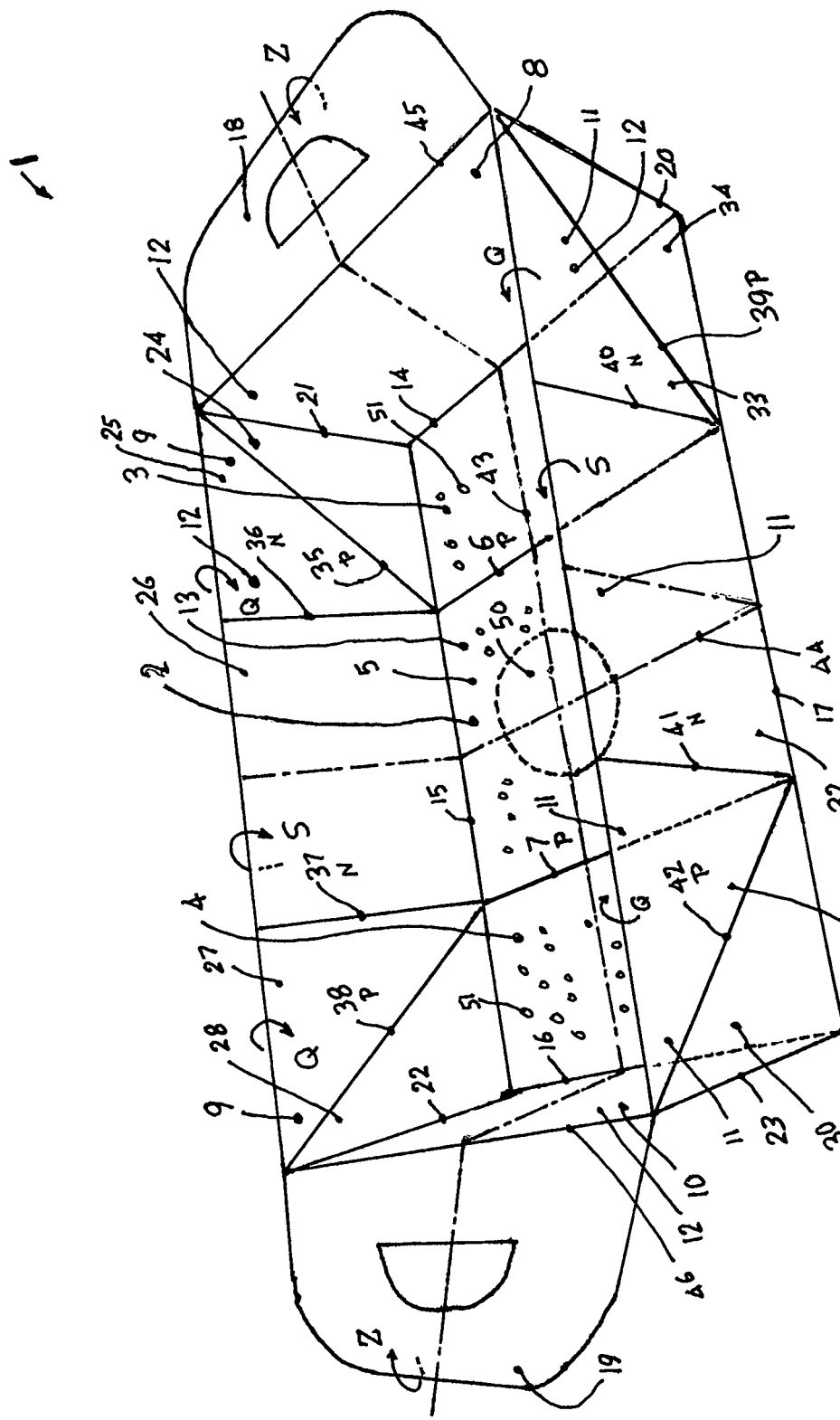
FIG. 1 shows an isometric view of foldable tray 1.

FIG. 1 shows an isometric view of an embodiment of the present invention. As shown therein, a spillage-of-contents-resistant foldable tray (for example, for use as a disposable cat litter tray) 1 comprises a base 2. Preferably, base 2 is of a rectangular shape. Base 2 comprises a generally rectangular right portion 3, a generally rectangular left portion 4 and a generally rectangular middle portion 5. Right portion 3 and middle portion 5 are joined together by right common folding/fold line 6. Preferably, said right common folding line 6 is a positive fold line, i.e., the upper surfaces of portions 3 and 5 rotate towards each other when right handle 18 and left handle 19 of said tray 1 are lifted up and brought closer to one another in order to close said foldable tray 1.

Similarly, left portion 4 and middle portion 5 are joined together by left common folding/fold line 7. Preferably, said left common folding line 7 is a positive fold line, i.e., the upper surfaces of portions 4 and 5 rotate towards each other when said right handle 18 and said left handle 19, of said tray 1, are lifted up and brought closer to one another in order to close said foldable tray 1.

Base 2 is surrounded by right short side 8, rear long side 9, left short side 10 and front long side 11. Sides 8, 9, 10 and 11, successively, form an outwardly slanted continuous wall 12 which surrounds base 2 and, in combination with base 2, define and form a cavity 13. Preferably, cavity 13 has a rectangular top view and trapezoidal front and side sectional views, thus rendering wall 12 to be an outwardly slanted wall and tray 1 to be a nestable tray.

Right short side 8 and right portion 3 are joined together at right base short line 14. Rear long side 9 and portions 3, 5 and 4, successively, are joined together at rear base long line 15. Left short side 10 and left portion 4 are joined together at left base short line 16. Front long side 11 and portions 4, 5 and 3, successively, are joined together at front base long line 17.

Right handle 18 is joined to right short side 8 at top edge 45 of right short side 8. Similarly, left handle 19 is joined to left short side 10 at top edge 46 of left short side 10.

As shown in FIG. 1, sides 8, 9, 10 and 11, respectively, are joined and form right front corner line 20, right rear corner line 21, left rear corner line 22 and left front corner line 23, successively.

Also, as shown in FIG. 1, rear long side 9 is divided into continuously-joined segments; rear right rigidly-held segment 24, rear immediate right adjacent segment 25, rear middle segment 26, rear immediate left adjacent segment 27 and rear left rigidly-held segment 28.

Similarly, front long side 11 is divided into continuously-joined segments; front left rigidly-held segment 30, front immediate left adjacent segment 31, front middle segment 32, front immediate right adjacent segment 33 and front right rigidly-held segment 34.

As shown in FIG. 1, segments 24 and 25 are joined together at fold line 35. Preferably, fold line 35 is a positive fold line, i.e., the internal surfaces (i.e., the surfaces facing the interior of cavity 13) of segments 24 and 25 automatically rotate towards each other upon pushing segment 26 towards the interior of cavity 13.

Segments 25 and 26 are joined together at fold line 36. Preferably, fold line 36 is a negative fold line, i.e., the internal surfaces (i.e., the surfaces facing the interior of cavity 13) of segments 25 and 26 rotate away from each other upon pushing segment 26 towards the interior of cavity 13.

Segments 26 and 27 are joined together at fold line 37. Preferably, fold line 37 is a negative fold line, i.e., the internal surfaces (i.e., the surfaces facing the interior of cavity 13) of segments 26 and 27 rotate away from each other upon pushing segment 26 towards the interior of cavity 13.

Segments 27 and 28 are joined together at fold line 38. Preferably, fold line 38 is a positive fold line, i.e., the internal surfaces (i.e., the surfaces facing the interior of cavity 13) of segments 27 and 28 automatically rotate towards each other upon pushing segment 26 towards the interior of cavity 13.

Also, as shown in FIG. 1, segments 30 and 31 are joined together at fold line 42. Preferably, fold line 42 is a positive fold line, i.e., the internal surfaces (i.e., the surfaces facing the interior of cavity 13) of segments 30 and 31 automatically rotate towards each other upon pushing segment 32 towards the interior of cavity 13.

Segments 31 and 32 are joined together at fold line 41. Preferably, fold line 41 is a negative fold line, i.e., the internal surfaces (i.e., the surfaces facing the interior of cavity 13) of segments 31 and 32 rotate away from each other upon pushing segment 32 towards the interior of cavity 13.

Segments 32 and 33 are joined together at fold line 40. Preferably, fold line 40 is a negative fold line, i.e., the internal surfaces (i.e., the surfaces facing the interior of cavity 13) of segments 32 and 33 rotate away from each other upon pushing segment 32 towards the interior of cavity 13.

Figure 2:
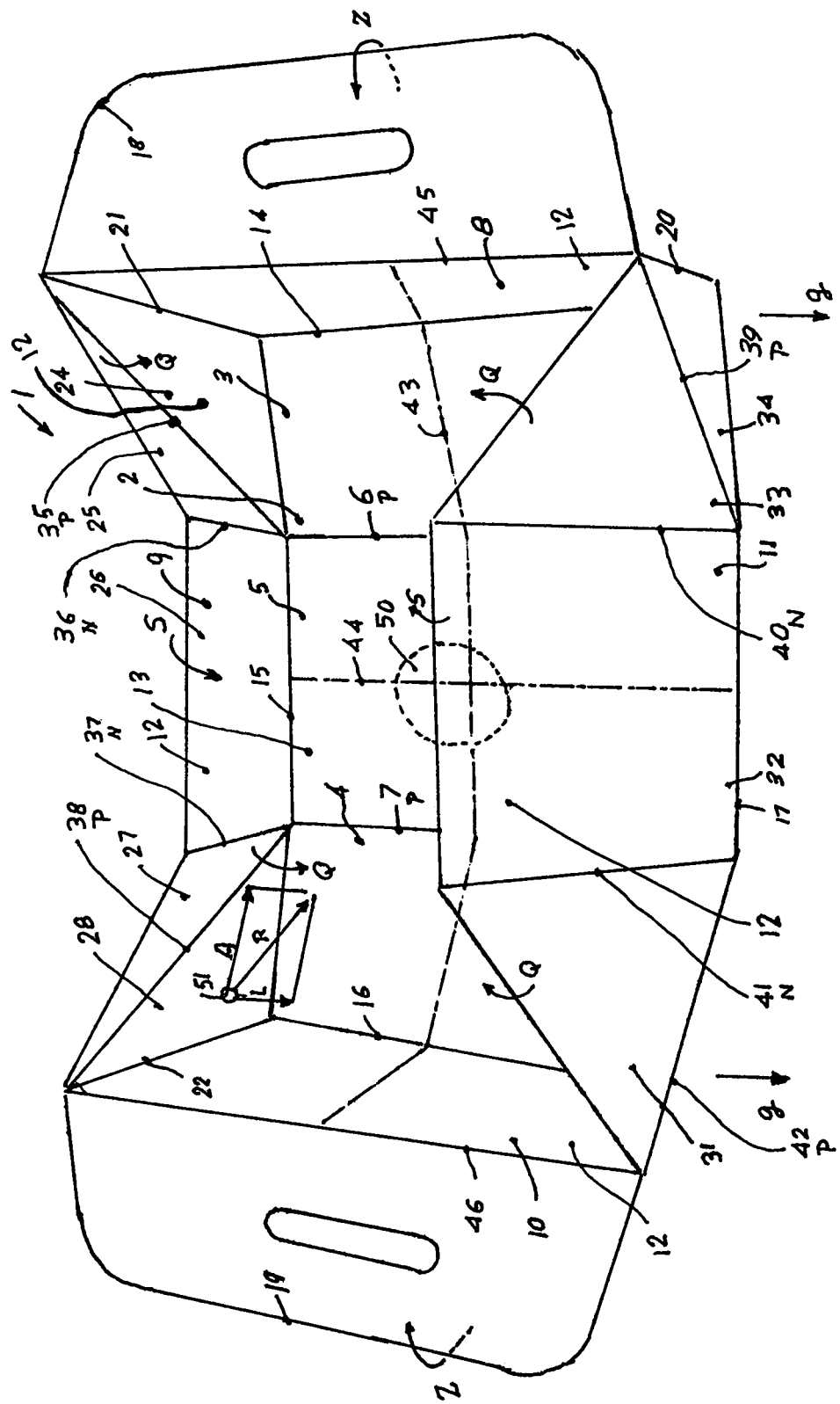
FIG. 2 shows an isometric view of partially-folded tray 1.

Segments 33 and 34 are joined together at fold line 39. Preferably, fold line 39 is a positive fold line, i.e., the internal surfaces (i.e., the surfaces facing the interior of cavity 13) of segments 33 and 34 automatically rotate towards each other upon pushing segment 32 towards the interior of cavity 13. Thus upon placing a substantially-uniform-depth layer of cat litter granules or other contents in said cavity 13, pushing said middle segment 26 of said rear long side 9 and said middle segment 32 of said front long side 11 to rotate inwardly, i.e., towards the interior of said cavity 13, as shown by arrows S, and lifting said handles 18 and 19, as shown by arrows Z, in order to close said tray 1, said rear immediate right adjacent segment 25, said rear immediate left adjacent segment 27, said front immediate left adjacent segment 31 and said front immediate right adjacent segment 33, also automatically rotate inwardly towards the interior of said cavity 13, as shown by arrows Q, and, as shown in FIG. 2, cause cat litter granules or other contents 51, adjacent to said rear long side 9 and adjacent to said front long side 11, to acquire a displacement component L parallel to lateral axis of symmetry 44 of tray 1 in addition to their displacement component A parallel to longitudinal axis of symmetry 43 of tray 1, caused by lifting handles 18 and 19 against the action of gravitational force (g), and bringing them closer to each other in order to close tray 1. As a result, the cat litter granules or other contents 51 will acquire a resultant displacement R towards central zone 50 and accumulate with a greater pile height at said central zone 50 of said base 2 and, thus, said litter granules or other contents 51 will be prevented from spilling out of the tray, over long sides 9 and 11.

Figure 3:
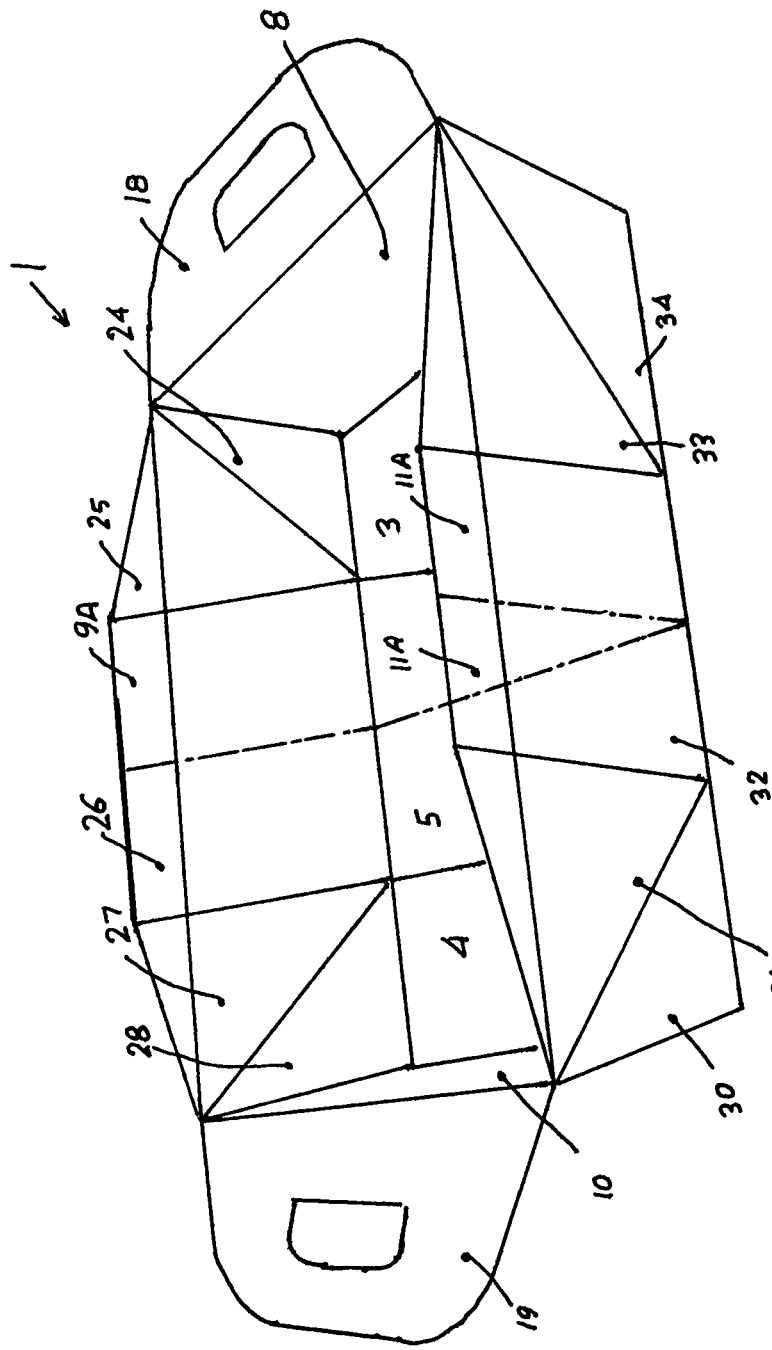
FIG. 3 shows an isometric view of foldable tray 1 featuring higher heights of rear and front long sides.

FIG. 3 shows another embodiment of the spillage-of-contents-resistant foldable tray 1 of the present invention featuring higher height of rear long side 9A and front long side 11A in order to further minimize the possibility of spillage of contents of the tray while said tray 1 is being folded before it is discarded.

Figure 4:
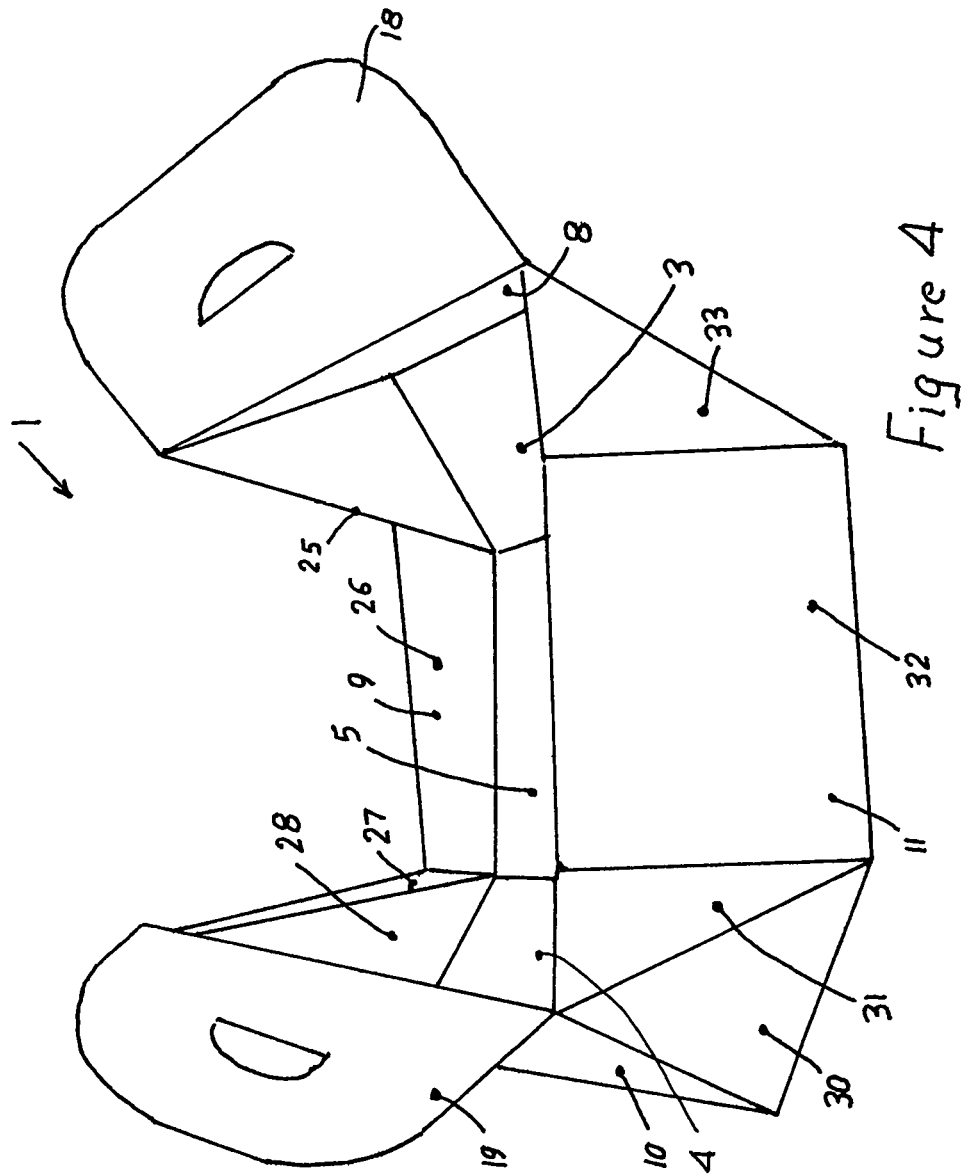
FIG. 4 shows an isometric view of further partially folded tray 1.
Figure 5:
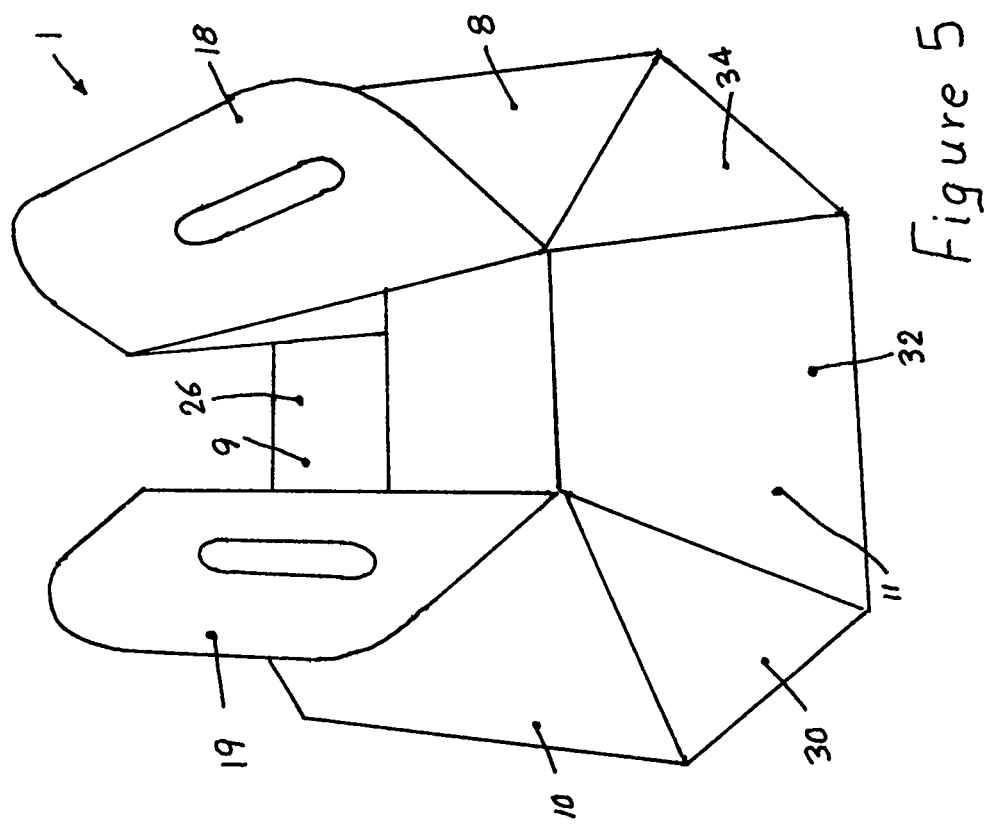
FIG. 5 shows an isometric view of further partially folded tray 1.
Figure 6:
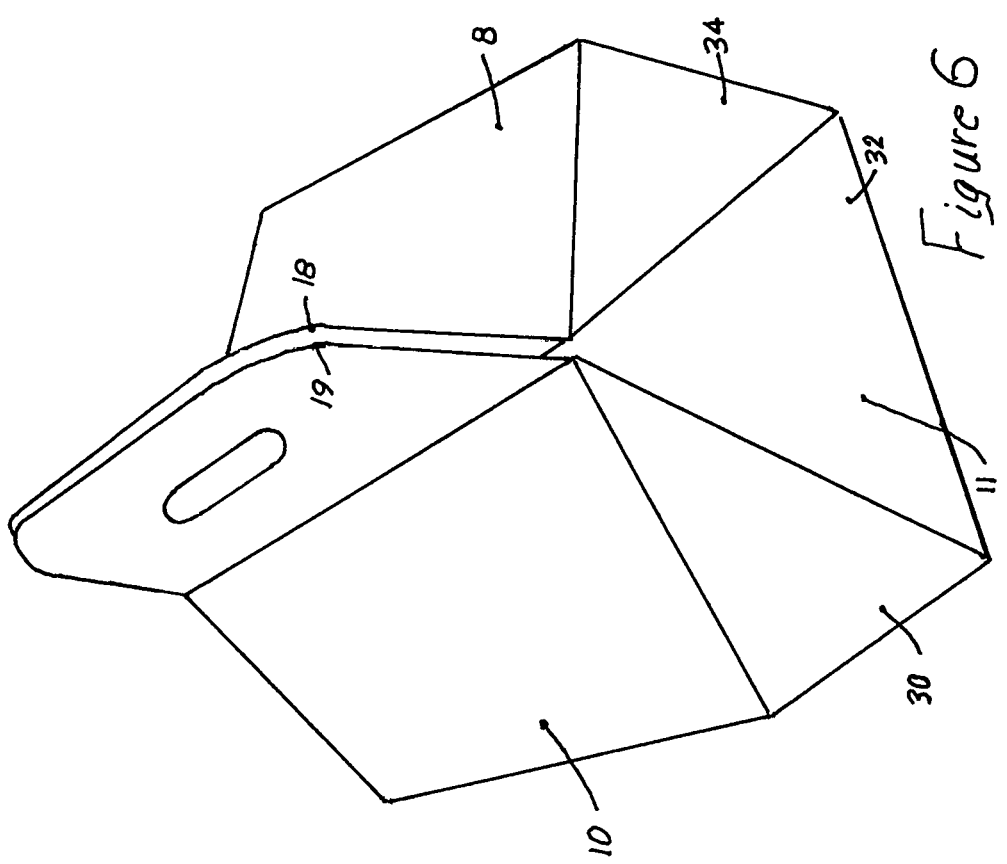
FIG. 6 shows an isometric view of a completely folded tray 1.

Self-explanatory FIGS. 4, 5 and 6 show successive, automatically occurring, configurations of foldable tray 1 when handles 18 and 19 are lifted up and brought together in order to close tray 1. In accordance with the present invention, these successive automatically occurring configurations are attributable to fold lines 6, 7, 35, 36, 37, 38, 39, 40, 41 and 42 which make tray 1 a spillage-of-contents-resistant foldable tray as shown, in isometric view, in FIG. 6.

Figure 7:
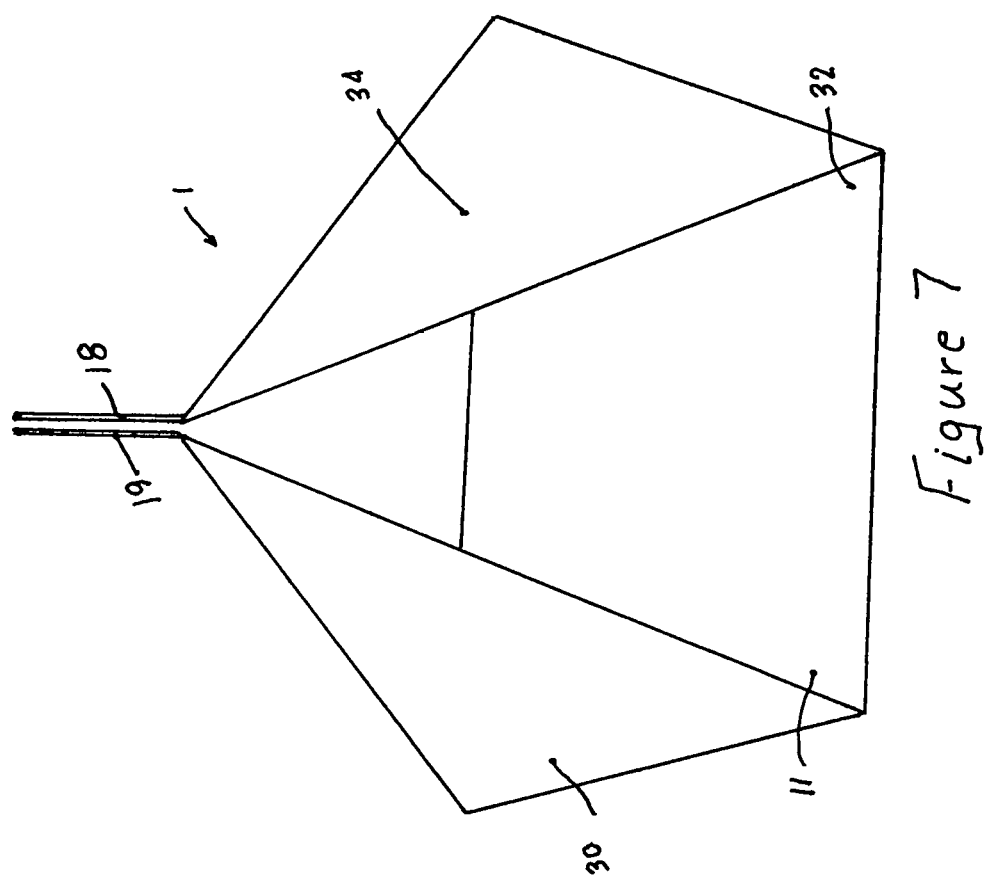
FIG. 7 shows a side view of a completely folded tray 1.

FIG. 7 shows a side view of completely closed/folded tray 1.

Figure 8:
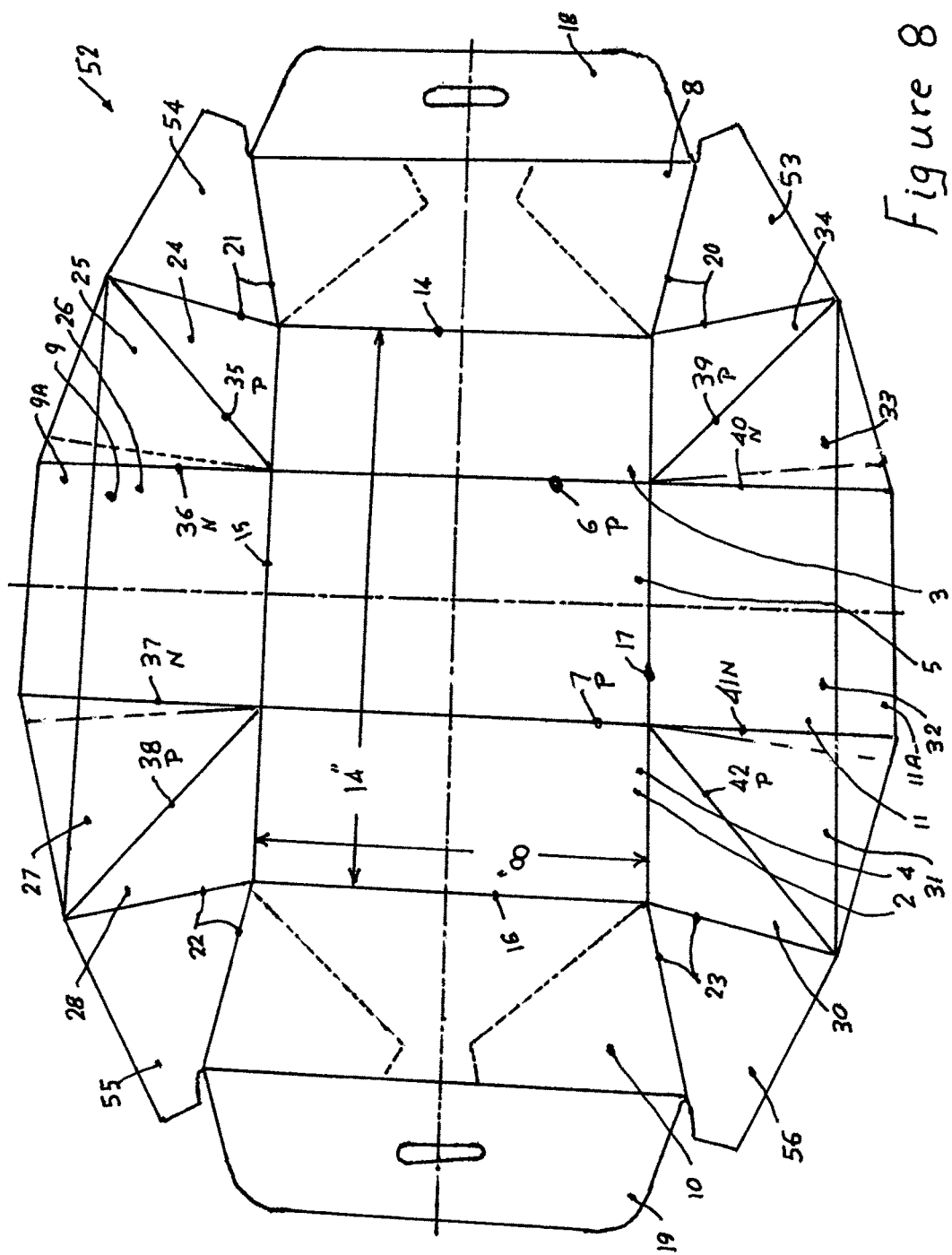
FIG. 8 shows a top view of a suitably shaped/profiled die cut and scored, with fold lines, blank sheet used for making foldable tray 1.

FIG. 8 shows a drawn-to-scale blank sheet 52 for making the foldable tray of the present invention, with a base 2 of 8 inch width and 14 inch length. As shown therein, this blank features higher heights of rear long side 9A and front long side 11A. Also, as shown in FIG. 8, assembly flaps 53, 54, 55 and 56 are used for making tray 1 by bending blank sheet 52 at fold lines 14, 15, 16 and 17 and attaching flaps 53 and 54 to right short side 8 and attaching flaps 55 and 56 to left short side 10 by the use of adhesives, stapling, heat sealing, ultrasonic bonding or other methods or means known in the art.

In accordance with the present invention, tray 1 may be made of paper cardboard, corrugated cardboard, plastic material, hydroformed fibrous material and thin plastic or metal sheet material and manufactured on cardboard processing machines, thin metal sheet processing machines, injection molding machines, thermoformers, rotational molding machines, and hydroformers known in the art.

The invention claimed is:

1. A spillage-of-contents-resistant foldable tray 1 comprising a cavity 13, a right handle 18 and a left handle 19, said cavity 13 being defined by and comprising a rectangular base 2 and a continuous outwardly slanted wall 12 surrounding said base 2, said cavity 13 having a trapezoidal-shape front view, a trapezoidal-shape side view and a rectangular-shape top view, thereby rendering said foldable tray 1 nestable, said base 2 comprising a rectangular right portion 3 having an upper surface, a rectangular left portion 4 having an upper surface and a rectangular middle portion 5 having an upper surface and being located between said right portion 3 and said left portion 4 of said base 2, said right portion 3 and said middle portion 5 being joined together by a right common fold line 6 and said left portion 4 and said middle portion 5 being joined together by a left common fold line 7, said continuous slanted wall 12 comprising, successively, an outwardly slanted right short side 8, an outwardly slanted rear long side 9, an outwardly slanted left short side 10 and an outwardly slanted front long side 11, said outwardly slanted rear long side 9 comprising, successively, i) a right rigidly held triangular segment 24, ii) an immediate right adjacent triangular segment 25 joined to said right rigidly held triangular segment 24 at fold line 35, iii) a middle segment 26 joined to said immediate right adjacent triangular segment 25 at fold line 36, iv) an immediate left adjacent triangular segment 27 joined to said middle segment 26 at fold line 37 and v) a left rigidly held triangular segment 28 joined to said immediate left adjacent triangular segment 27 at fold line 38, said outwardly slanted front long side 11 comprising, successively, i) a left rigidly held triangular segment 30, ii) an immediate left adjacent triangular segment 31 joined to said left rigidly held triangular segment 30 at fold line 42, iii) a middle segment 32 joined to said immediate left adjacent triangular segment 31 at fold line 41, iv) an immediate right adjacent triangular segment 33 joined to said middle segment 32 at fold line 40 and v) a right rigidly held triangular segment 34 joined to said immediate right adjacent triangular segment 33 at fold line 39, said continuous outwardly-slanted wall 12 being joined to said base 2, successively; i) at right base short line 14 joining said outwardly slanted right short side 8 and said right portion 3, ii) at rear base long line 15 joining said rear outwardly slanted long side 9 and said right portion 3, said middle portion 5 and said left portion 4, iii) at left base short line 16 joining said left outwardly-slanted short side 10 and said left portion 4, and iv) at front base long line 17 joining said outwardly-slanted front long side 11 and said left portion 4, said middle portion 5 and said right portion 3, thereby forming, successively, i) right front rigid corner line 20, joining said outwardly slanted front long side 11 to said outwardly slanted right short side 8, ii) right rear rigid corner line 21, joining said outwardly slanted right short side 8 to said outwardly slanted rear long side 9, iii) left rear rigid corner line 22, joining said outwardly slanted rear long side 9 to said outwardly slanted left short side 10, and iv) left front rigid corner line 23, joining said outwardly slanted left short side 10 to said outwardly slanted front long side 11, and said right handle 18 being joined to said right short side 8 at top edge 45 of said right short side 8, and said left handle 19 being joined to said left short side 10 at top edge 46 of said left short side 10, thereby, upon placing a substantially-uniform-depth layer of cat litter granules 51 in said cavity 13, pushing said middle segment 26 of said rear long side 9 and said middle segment 32 of said front long side 11 to rotate towards the interior of said cavity 13, and lifting said handles 18 and 19 in order to close said tray 1, said rear immediate right adjacent segment 25, said rear immediate left adjacent segment 27, said front immediate left adjacent segment 31 and said front immediate right adjacent segment 33, also automatically rotate inwardly towards the interior of said cavity 13 and cause said cat litter granules 51, adjacent to said rear long side 9 and adjacent to said front long side 11, to acquire a displacement component L parallel to said lateral axis of symmetry 44 of said tray 1 in addition to their displacement component A parallel to said longitudinal axis of symmetry 43 of said tray 1, caused by lifting said handles 18 and 19 and bringing them closer to each other in order to close said tray 1, thus causing said granules 51 acquire a resultant displacement R towards said central zone 50 and accumulate with a greater pile height at said central zone 50 of said base 2 and, thus, said litter granules 51 would be prevented from spilling out of said tray 1, over said long sides 9 and 11.

* * * * *